(12) United States Patent
Advani et al.

(10) Patent No.: US 7,762,122 B2
(45) Date of Patent: Jul. 27, 2010

(54) SYSTEM AND METHOD OF DETECTING AIR LEAKAGE IN A VARTM PROCESS

(75) Inventors: Suresh G. Advani, Newark, DE (US); Fuping Zhou, Clinton, NJ (US); Justin Beech Alms, Newark, DE (US); Charlotte C. Corlay, Issy les Moulineaux (FR)

(73) Assignee: University of Delaware, Newark, DE (US)

( * ) Notice: Subject to any disclaimer, the term of this patent is extended or adjusted under 35 U.S.C. 154(b) by 552 days.

(21) Appl. No.: 11/742,243

(22) Filed: Apr. 30, 2007

(65) Prior Publication Data

US 2009/0273107 A1 Nov. 5, 2009

Related U.S. Application Data

(60) Provisional application No. 60/746,156, filed on May 1, 2006.

(51) Int. Cl.
*G01M 3/04* (2006.01)
(52) U.S. Cl. ...................................... 73/49.2
(58) Field of Classification Search ................ 73/49.2, 73/49.3, 49.8
See application file for complete search history.

(56) References Cited

U.S. PATENT DOCUMENTS

2002/0081147 A1* 6/2002 Gianaris et al. ............. 403/223

* cited by examiner

*Primary Examiner*—John Fitzgerald
(74) *Attorney, Agent, or Firm*—RatnerPrestia

(57) ABSTRACT

A method of detecting leakage from a preform used in a VARTM process includes providing a mold and bagging film suitable for use in the VARTM process; heating air; distributing hot air along an interface between an the bagging film and a surface of the mold; determining a temperature distribution along the interface; and using the temperature distribution to locate one or more leaks in the bagging film.

7 Claims, 4 Drawing Sheets
(2 of 4 Drawing Sheet(s) Filed in Color)

SYSTEM AND METHOD OF DETECTING AIR LEAKAGE IN A VARTM PROCESS

CROSS-REFERENCE TO RELATED APPLICATION

This application is a non-provisional application claiming benefit under 35 U.S.C. §119(e) to U.S. Provisional Application 60/746,156, filed on May 1, 2006, the entire contents of which are incorporated herein by reference.

RESEARCH AND DEVELOPMENT

The United States Government may have certain rights in this application in accordance with the terms of Office of Naval Research (ONR) contract/grant no. N00014-05-1-0832.

BACKGROUND

This disclosure is directed to an improved Vacuum Assisted Resin Transfer Molding (VARTM) process.

Resin Transfer Molding (RTM) provides a cost-effective fabrication method for the manufacture of polymer composites. In a traditional RTM process, catalyzed thermosetting resin is injected into an enclosed metal mold containing a previously positioned reinforcement preform. The preform is compacted to the specified fiber volume fraction when the matched metal mold is closed. The resin wets out the fiber until the mold is filled, and the part is then cured inside the mold.

RTM offers several advantages over other composite fabrication methods such as autoclave and compression molding of prepreg tape laminates. First, high fiber volume fraction composites can be fabricated with low void contents. Second, parts with highly complex shapes can be molded by incorporating many components into a single preform. This helps to reduce the cost and weight of the structure. Third, hand lay-up of prepreg tape is eliminated. Production rates are increased and operating costs are reduced. Finally, RTM is a closed mold process that reduces workers' exposure to harmful volatiles, i.e., styrene, associated with many of the room temperature processing resins.

Composites are fibrous materials infused with a tough and durable plastic. Composite material is a technology that is being used to make many items stronger and lighter. These materials are being incorporated into the armor of combat vehicles, weapons, and soldiers, for example. Developing a method that is fast and reliable is critical. A controlled setup is desirable in order to get optimized infusion. One process in which infusion is optimized is "Vacuum Assisted Resin Transfer Molding" (VARTM).

The VARTM process is an increasingly popular type of Liquid Composite Molding. In VARTM, resin is drawn into a mold by vacuum pressure and distributed evenly along a line in order to impregnate fibers. Generally, there are four steps in the process: First, the fabric preform is cut to a certain size, then it is put inside a one sided mold. Second, a bagging film is positioned around the fabric and adhered with tacky tape to the mold surface. Third, the resin is drawn into the mold and left until the fabric is saturated. Finally, the resin is cured then the final part is extracted from the mold.

As one example of this process, a vacuum pulls resin in from a feed tube to distribute it evenly into the preform. There are several different steps that must be followed in order to run a VARTM infusion process. A selection of materials that will be infused must be acquired. For example, twenty-four plies of glass and eleven plies of IM7 graphite may be stacked onto each other with the IM7 on the bottom. This creates the preform that will be infused. Another option for materials is a preform piece which may be held together by a binder.

The preform may be placed on a steel plate that has already been coated with several layers of a substance that deters two substances from bonding together, e.g., "Frekote". This is important so that the finished panel does not stick to the steel plate and is easily accessible. To also help in this regard, a sheet of peel ply may be placed between the preform and the plate. The peel ply is a highly permeable fabric allowing resin to flow through it, but not hardening with the preform. When the process is finished, the peel ply allows the preform to have a uniform texture. The next step is to place another sheet of peel ply on top of the glass, so the vacuum bag does not stick to the finished composite panel. A layer of SCRIMP (Seemann Composite Resin Infusion Molding Process) distribution medium may be positioned on the glass. This enables the resin to travel at a higher speed so that it creates a sharper driving force to introduce resin into the preform.

Tacky tape may form the perimeter around the entire preform. It may be placed about two to three inches wider than the preform to give room for tubing and bagging. A piece of tubing, which has been cut in a spiral shape, may be placed at the back of the preform. Another piece of tubing, which is connected to the vacuum pot, is inserted into the coiled tubing. The vacuum pot is a sealed bucket that collects any excess resin that comes out of the preform. This is important because the vacuum pump could be ruined if resin enters the vacuum line. A feed line is then installed at the front of the piece. These lines may be made airtight by wrapping tacky tape around the edges that cross the previously made tacky tape perimeter.

The final step in the setup is the addition of the vacuum bag. The bag may be adhered to the tacky tape and positioned around the tubes. When there is excess bag in an area, an "ear" may be formed with tacky tape to guarantee that the bag will be airtight. Maintaining an airtight enclosure is a crucial step because any small holes could cause loss of a full vacuum and degrade the VARTM process.

During the VARTM process, checking the vacuum level is standard procedure especially when a large part is being made. Any air leakage will decrease the part quality and the part will be most likely be discarded.

Several conventional methods of leak detection in vacuum infusion processes have existed for some time, and have been used in the large scale manufacturing of industrial products. Current techniques of leak detection include leak isolation and sound magnification, both of which have disadvantages.

The primary leak isolation method used in industry and research today is simple, and is performed by vacuuming the air out of the mold, then clamping off the gates. If the vacuum pressure level has not decreased after a predetermined amount of time, the mold is considered to be free of air leaks. The disadvantage to this method is that it only able to indicate if there is or is not a leak, and does not specify the location of any leak.

Sound magnification is also simple and may be used to find the location of a leak. The method utilizes a microphone and amplifies the sound to a set of speakers or headphones, and any leak which is producing a sound should be detectable. The main disadvantage of sound magnification is that does not work well, particularly in noisy industrial environments, which is the principal reason it is not commonly used in industrial composites manufacturing.

What is needed is a simple and inexpensive method and system to detect air leakage in a Vacuum Infusion Process.

SUMMARY

A method and system are disclosed to detect air leakage in any Vacuum Infusion Process. Hot air around 300 F is produced and distributed along the interface of the bagging film, tacky tape, and mold surface, or may be pumped into the mold itself of a VARTM setup. If there is any air leakage, hot air will be infused into or expelled out of the bagging, thus affecting the temperature distribution of the vacuum bag, which can be detected, by an infrared camera, for example.

BRIEF DESCRIPTION OF THE DRAWINGS

The patent or application files contains at least one drawing executed in color. Copies of this patent or patent application publication with color drawing(s) will be provided by the office upon request and payment of the necessary fee.

Various embodiments will be discussed with respect to the following drawing figures in which.

DETAILED DESCRIPTION

This system and method of leak detection is novel and advantageous to other approaches for numerous reasons.

Figure 1:
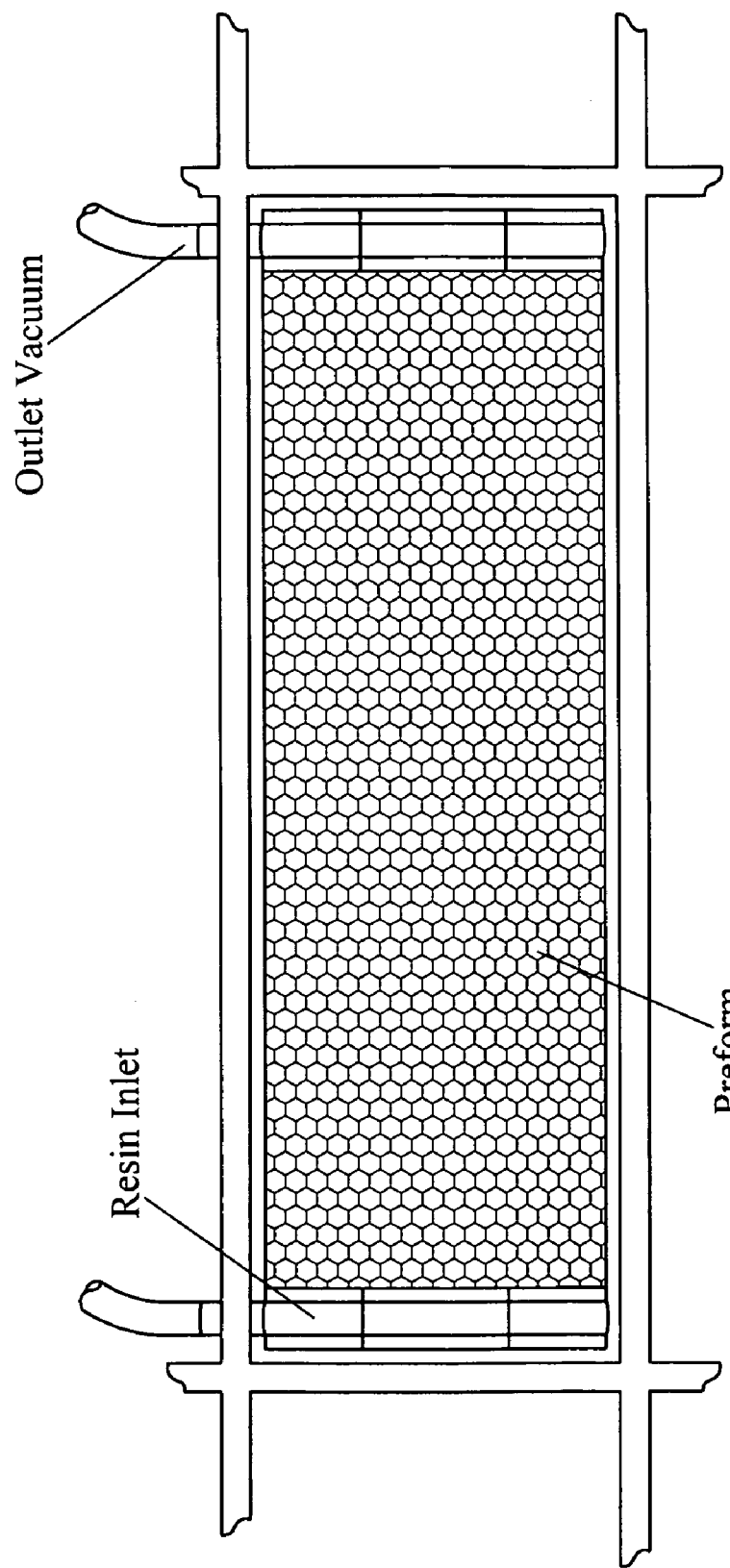
FIG. 1 illustrates a non-industrial apparatus for carrying out the VARTM process.

FIG. 1 shows a typical non-industrial VARTM set-up. On the left side there is a so-called "omega tube" that will allow resin to enter the mold. Prior to the infusion, this inlet is clamped off. In the middle portion, there is a stack of E-Glass preform. On the right side is an omega tube which is connected to a vacuum pump, which provides the driving pressure of the process.

In one embodiment, a method to detect air leakage in a Vacuum Infusion Process includes heating air. A heat gun may be used to produce hot air around 300 F. Hot air may be distributed along the interface of the bagging film, tacky tape, and mold surface, or may be pumped into the mold itself. If there is any air leakage, hot air will be infused into or expelled out of the bagging. Therefore the temperature distribution of the vacuum bag will be affected, which can be shown by an infrared camera, for example.

This novel method of Thermal Leak Detection works well even when only a tiny leak is present. Thermal leak detection uses a heat gun to warm air and introduce that air to potential leak areas around the mold. The method may also utilize an infrared camera to capture thermal images of the tested areas. Other appropriate temperature sensors may be used. Since an infrared camera can detect differences in temperature of about one quarter degree Fahrenheit, and the heat gun produces air at a temperature over 200 F above room temperature, identification of air moving into or out of the mold may be easily detected.

Figure 2:
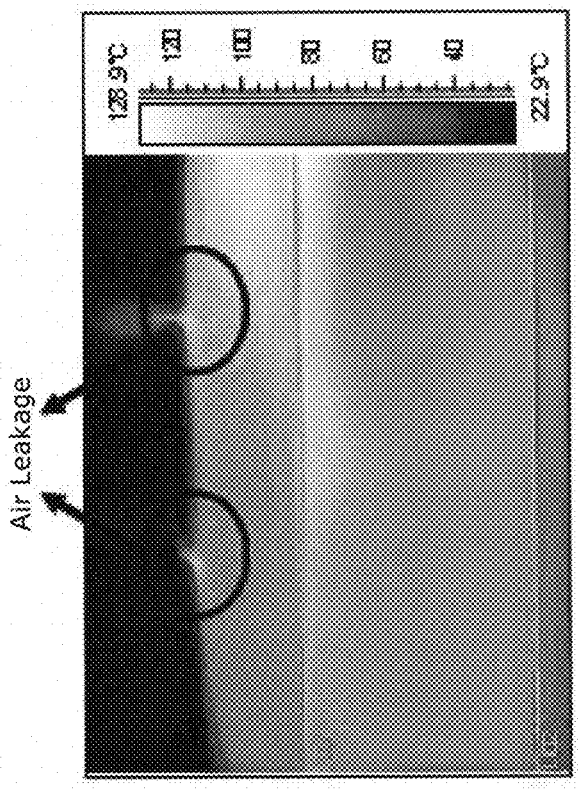
FIG. 2 illustrates an infrared photograph in which air leakage out of the bagging film is detected when hot air is injected into the bag.
Figure 2:
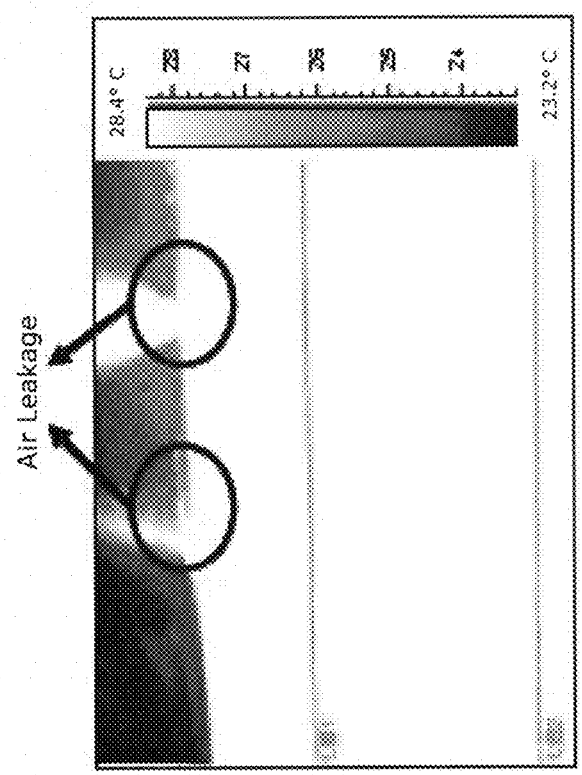
Figure 3:
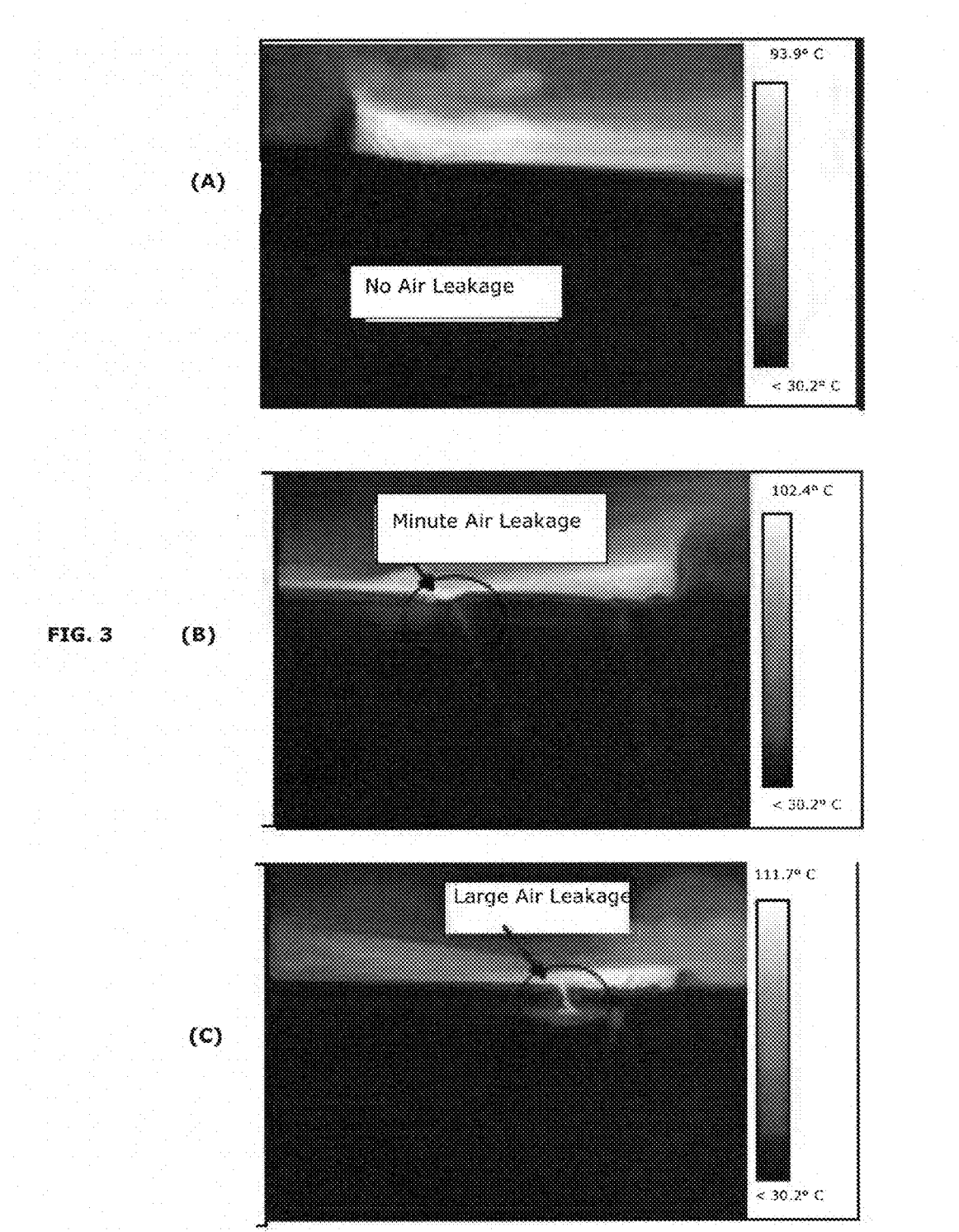
FIGS. 3(A)-3(C) illustrate the situation of no leakage, a minor leakage, and a larger air leakage when hot air is supplied with a heat gun around the edges of the bagging film when a vacuum is applied to the inside of the bagging film, showing that even a very small air leak is capable of being detected with this method.
Figure 4:
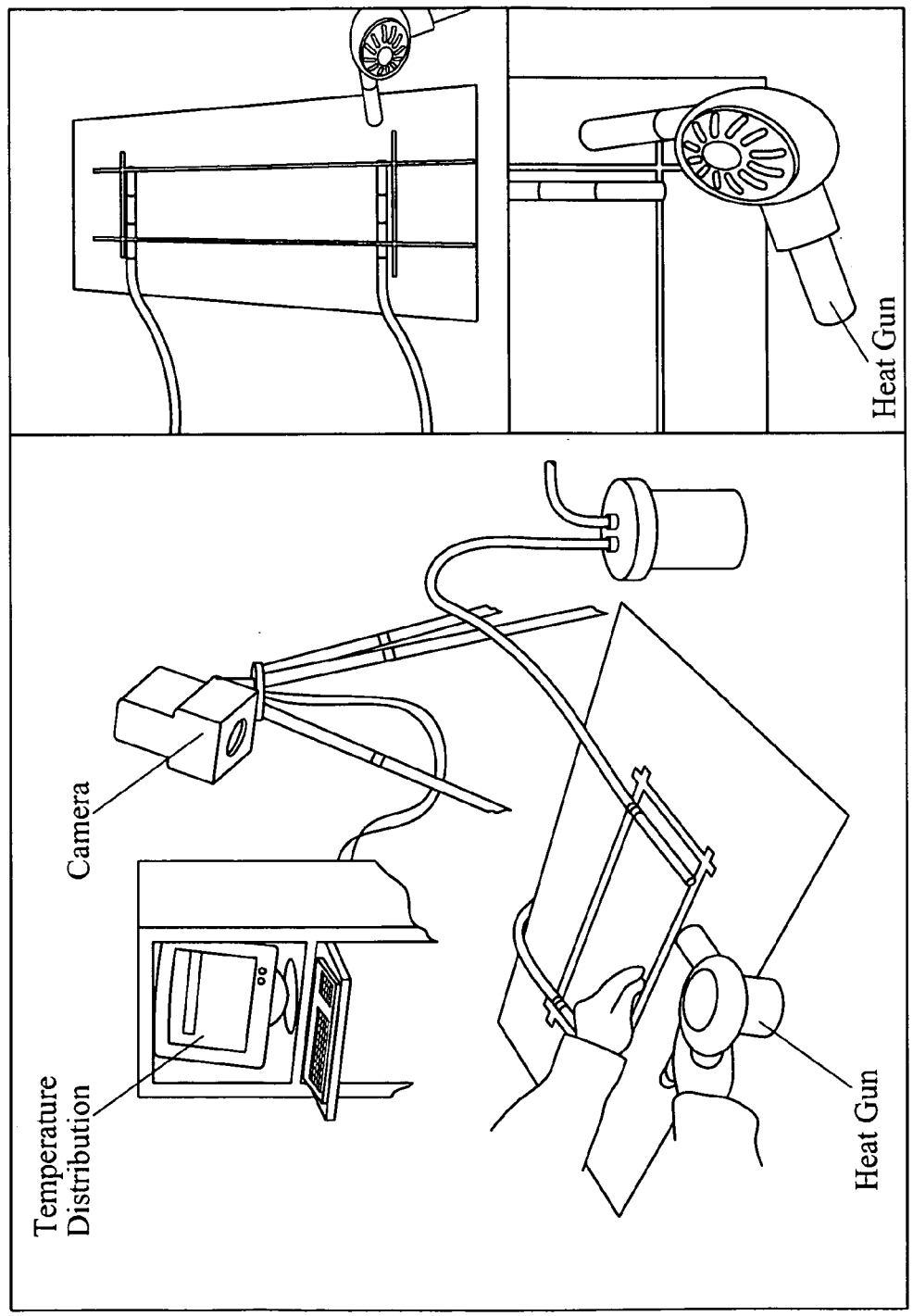
FIG. 4 provides a perspective view of several aspects of an operational setup that is useful in carrying out an embodiment of this disclosure.

The thermal leak detection method has two different yet similar procedures for leak detection. The first is to introduce the hot air into the mold with positive pressure (see FIG. 2). This inflates the bagging film and expels hot air out of the mold, which can be detected. The second uses vacuum pressure and compacting the fabrics as will be done during an injection, as shown in FIGS. 3(A)-(C). Then hot air is distributed along the areas of potential leaks, such as the interface of the bagging film, tacky tape, and mold surface. Hot air entering the mold can be identified using the infrared camera. Other suitable sensors may be employed that are sensitive to the temperature of escaping air or entering the bagging film.

Either procedure works well for determining the existence and location of leaks in a vacuum infusion process. The second procedure, i.e., vacuum assisted detection, has been determined to be easier to implement into the standard production of vacuum infused parts.

The first procedure of this leak detection process, i.e., hot air injection into the bagging film, could used in Resin Transfer Molding (RTM). Use in RTM preferably uses the first procedure where positive pressure is used to inject hot air into the mold. Air that escapes the mold in undesirable areas may then be detected by the infrared camera or other suitable sensor. This method is especially useful during large scale production of industrial parts because of its repeatable and reliable detection.

One potential disadvantage to this system and method is the use of an infrared camera, which is more costly than the equipment used in the conventionally discussed methods. Even though use of such a camera may be more expensive, the current cost of a single discarded low quality part due to the leak is typically several orders of magnitude more expensive then the camera itself. Hence an IR-sensitive camera is a good investment, and is easy to implement. Other types of IR sensors may be adapted for use with this method, for example, an IR sensor array and associated electronics. However, such alternatives may not be as easily implemented.

Experimental results have been obtained for both methods described above. For example, FIG. 3(A) depicts a situation with no detectable air leakage; FIG. 3(B) illustrates the case of a relatively minor leak; and FIG. 3(C) depicts a larger leak.

What is claimed as new and desired to be protected by Letters Patent of the United States is:

1. A method of detecting leakage from a preform used in a VARTM process, the method comprising:
   providing a mold and bagging film suitable for use in the VARTM process;
   heating air;
   distributing hot air along an interface between the bagging film and a surface of the mold;
   determining a temperature distribution along the interface; and
   using the temperature distribution to locate one or more leaks in the bagging film.

2. The method of claim 1, wherein the air is heated to about 300 F.

3. The method of claim 1, wherein said distributing hot air along an interface comprises introducing hot air into one or more of the mold and bagging film with a positive pressure.

4. The method of claim 1, wherein said determining a temperature distribution of the bagging film comprises using an infrared camera.

5. The method of claim 1, wherein said distributing hot air along an interface comprises using a vacuum pressure within one or more of the mold and bagging film,
   wherein said determining a temperature distribution along the interface comprises identifying hot air entering through the interface.

6. A system for detecting leakage from a preform used in a VARTM process, the system comprising:
- a mold and bagging film suitable for use in the VARTM process;
- an air heater;
- means for distributing hot air along an interface between the bagging film and a surface of the mold;
- a temperature sensor suitable for determining a temperature distribution along the interface; and
- a display configured to display the temperature distribution and locate one or more leaks along the interface.

7. The system of claim 6, further comprising a vacuum pump arranged to draw a vacuum within the bagging film, wherein the air heater is arranged to direct hot air along a portion of the interface outside the bagging film and mold.

* * * * *